June 21, 1932.  P. P. HESS  1,863,983
CHICKEN FEEDER
Filed June 12, 1930  4 Sheets-Sheet 1
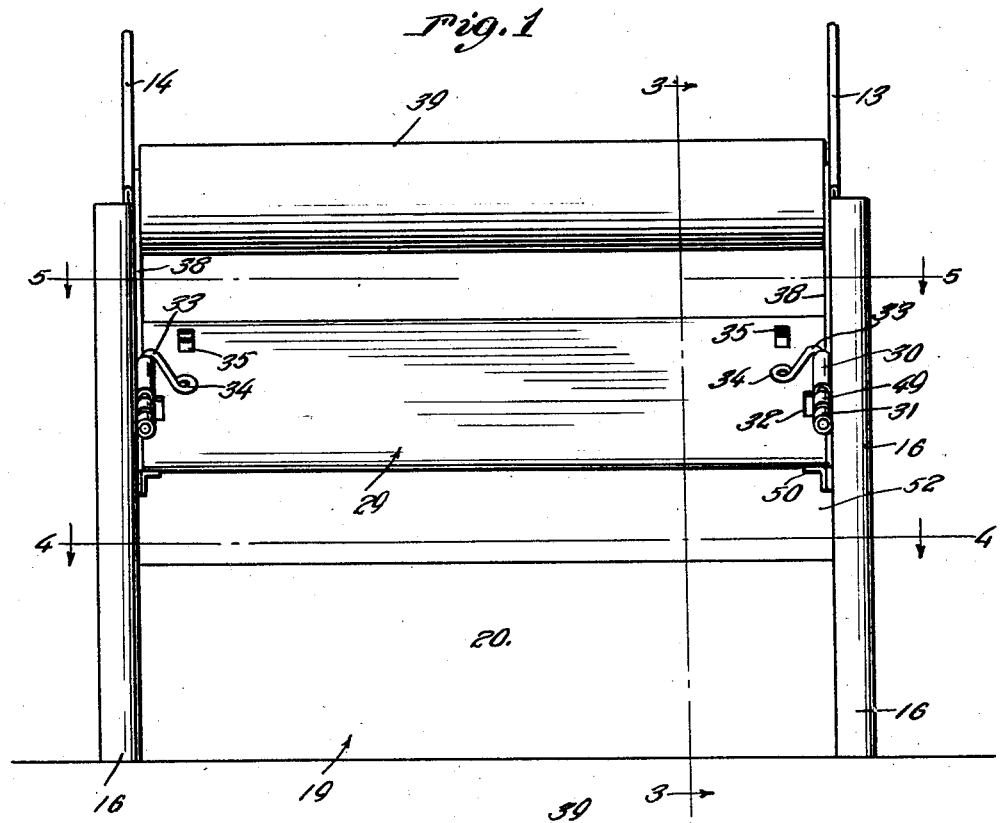
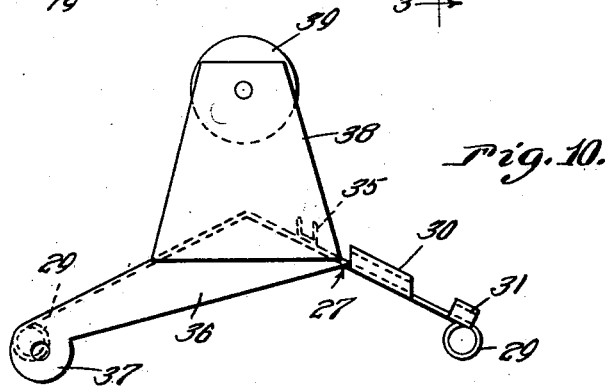
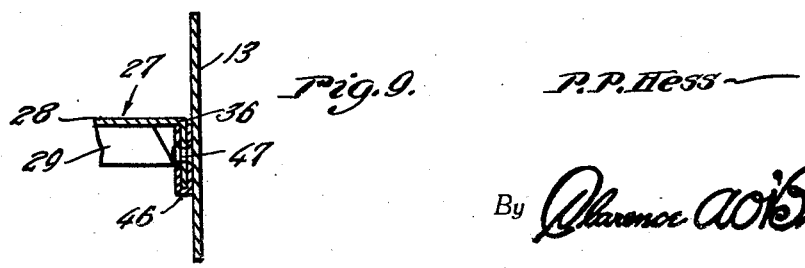
Inventor
P. P. Hess
By Clarence A. O'Brien
Attorney June 21, 1932.　　　P. P. HESS　　　1,863,983
CHICKEN FEEDER
Filed June 12, 1930　　4 Sheets-Sheet 2

Inventor
P. P. Hess
By Clarence A. O'Brien
Attorney

June 21, 1932. P. P. HESS 1,863,983
CHICKEN FEEDER
Filed June 12, 1930 4 Sheets-Sheet 3
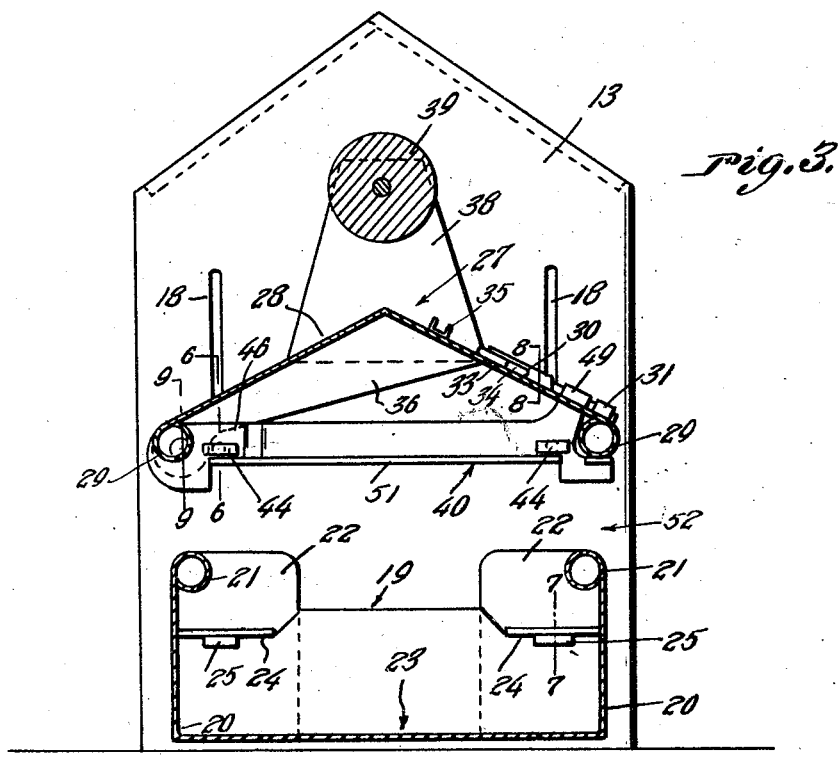
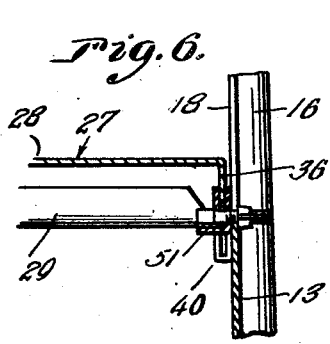
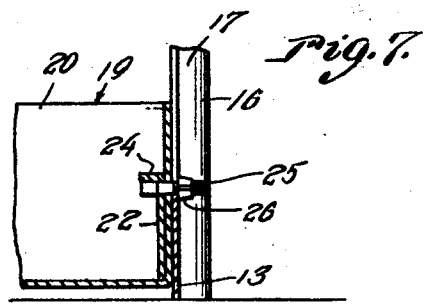
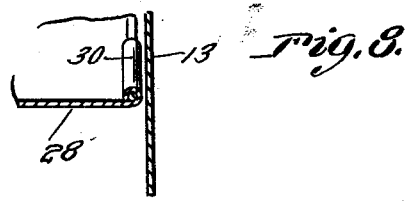
Inventor
P. P. Hess
By Clarence A. O'Brien
Attorney June 21, 1932.   P. P. HESS   1,863,983
CHICKEN FEEDER
Filed June 12, 1930    4 Sheets-Sheet 4

Inventor
P. P. Hess
By Clarence A. O'Brien
Attorney

Patented June 21, 1932

1,863,983

UNITED STATES PATENT OFFICE

PETER P. HESS, OF DREWRYS BLUFF, VIRGINIA

CHICKEN FEEDER

Application filed June 12, 1930. Serial No. 460,664.

This invention relates to an improved chicken feeder devised with a view toward providing a novel and appreciable contribution to the prior art, which is structurally different from the types of feeders now known to me, and which, it is believed, will better fulfill the requirements of a structure of this class, than similar prior art devices.

In carrying the present conception into effect, I have developed a practicable structure which is characterized by comparative simplicity and economy in construction and use, and which is expressly designed to promote sanitation and to avoid wasting of the feed.

Briefly stated, the structure is characterized by a novel type of housing including a pair of uprights forming the main end walls, together with a bodily adjustable and hingedly mounted canopy-like roof, and a feasible type of adjustable feed containing trough beneath said roof.

A structurally distinguishable part of the feeder, is the roost construction or assembly which is individualized by the incorporation therein of a number of mutually cooperating parts; namely, a pair of vertically adjustable end bars constituting supports for a swingable hingedly mounted canopy, cooperating latch means between the supports and canopy for holding the latter in a closed operative state for permitting the same to be swung back to position to expedite replenishing of the feed in the trough, said canopy being provided with end standards supporting a roller type roost, for preventing roosting on the roof.

Another outstanding structural feature of the invention is the trough construction which embodies an adjustable bottom and supporting members therefor wherein the entire assembly is bodily adjustable in a vertical plane toward and from the roof so as to regulate the size of the entrance slots defined between the longitudinal edge portions of the trough and the corresponding portions of the roof.

The advantages and features of the invention will become more readily apparent from the following description and drawings.

In the drawings:—

Figure 1 is a side elevational view of the complete structure as devised in accordance with the present inventive conception.

Fig. 3 is a transverse vertical sectional view taken on the plane of the line 3—3 of Fig. 1.

Fig. 6 is an enlarged detail section on the line 6—6 of Fig. 3.

Fig. 7 is a similar sectional view on the line 7—7 of Fig. 3.

Figs. 8 and 9 are similar sectional views on the lines 8—8 and 9—9 respectively of Fig. 3.

Fig. 10 is an end view of the canopy of the roof assembly.

Figure 11:
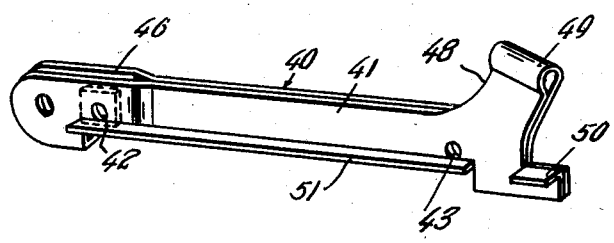

Fig. 11 is a perspective view of one of the end supporting bars for the canopy.

Figure 12:
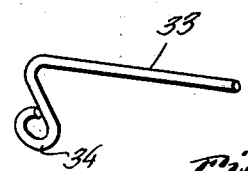
Figure 4:
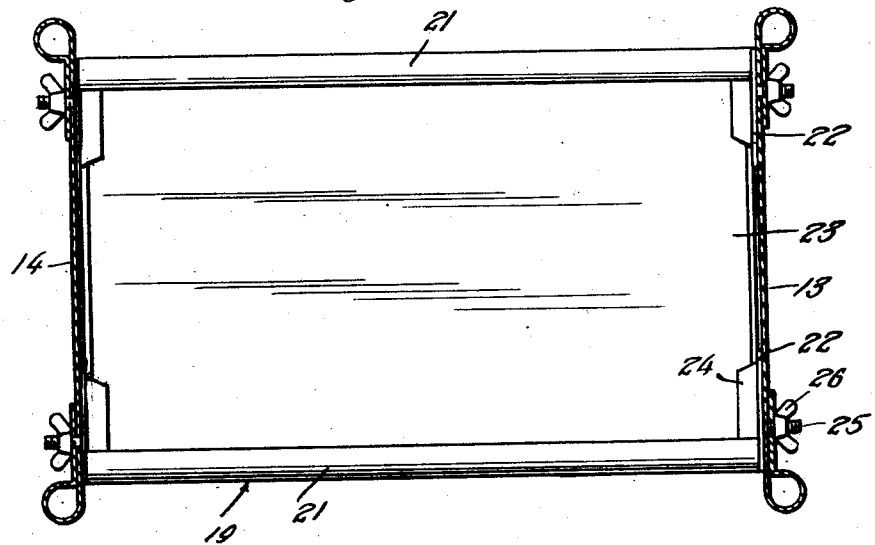
Fig. 4 is a section on line 4—4 of Fig. 1.
Figure 5:
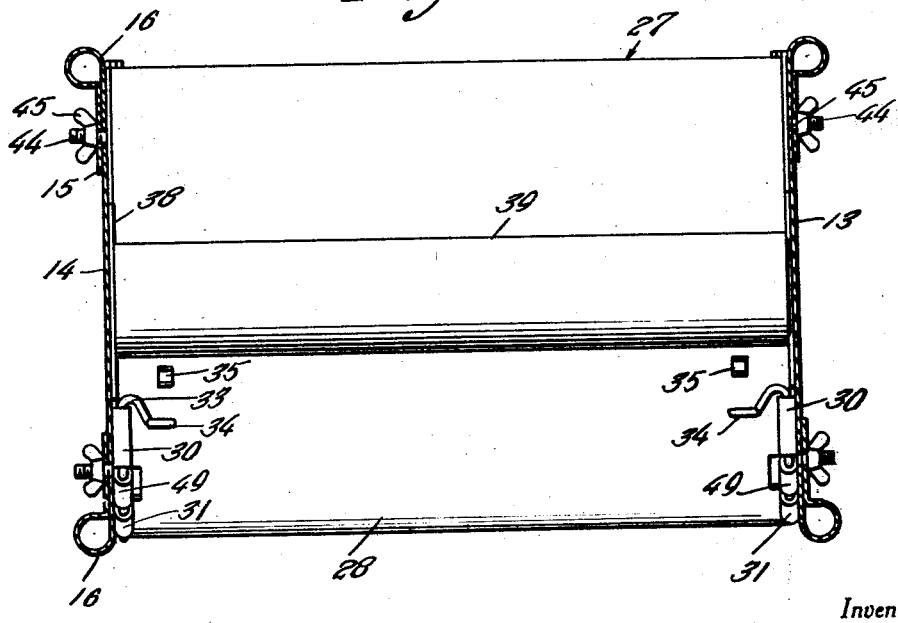
Fig. 5 is a section on line 5—5 of Fig. 1, but with the roller 39 in plan.

Fig. 12 is a perspective view of a slidable latch pin.

Figure 2:
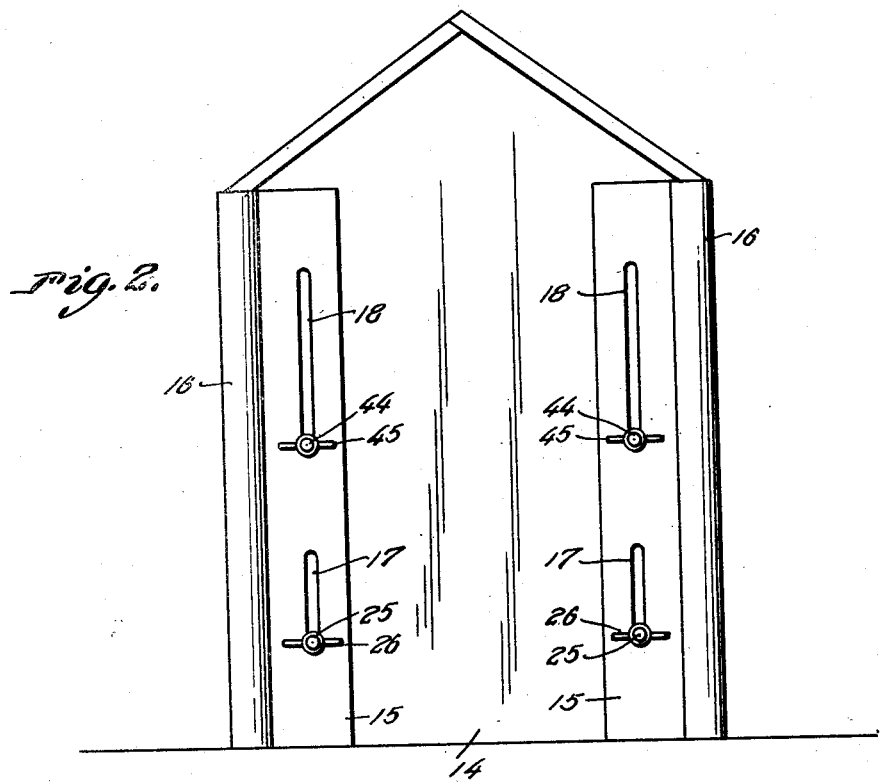
Fig. 2 is an end elevational view of the structure, observing it for instance, in a direction from left to right in Fig. 1.

The numerals 13 and 14 designate a pair of end plates or uprights. These are of appropriate shape and proportion and as seen in Fig. 2, the vertical end edges are bent back upon themselves as at 15 to form reinforcing beads 16. Each end plate is formed with upper and lower pairs of slots for instance, a pair of relatively short lower slots 17 and a pair of longer upper slots 18. Incidentally the slots 17 cooperate with the trough construction and the slots 18 with the roof assembly.

As shown in Fig. 3, the trough is generally designated by the numeral 19. It comprises a pair of spaced parallel side plates 20 having rolled reinforcing beads 21 along the top edges. These plates are provided with end extensions which are bent at right angles to form flanges 22 which cover the slots 17. These flanges 22 are disposed in sliding contact with the inner faces of the opposite end walls 13 and 14 as is obvious. The numeral 23 designates the bottom which is disposed downwardly with respect to the beads 21 and has its ends bent upwardly so as to form a sort of a receptacle to receive the feed (not shown). The ends of each end part is cut and bent inwardly to form the flanges 24.

This trough structure is adjustably bolted to the slotted end walls 13 and 14 thru the medium of four bolts, indicated by the numerals 25. The headed ends of the bolts as shown in Fig. 3, are located beneath the inturned flanges 24. This is clear from Fig. 7, and from the last-named figure, it will be seen that the threaded ends of the bolts extend outwardly through the slots 17 where they are provided with thumb nuts 26. This bolt and slot arrangement permits the entire trough as a unit to be raised or lowered with respect to the end walls. The beads 21 form ridges to facilitate feeding by small chicks.

I now invite attention to the roof assembly which as before stated, is of a composite or multiple part construction. First, it will be observed that the major part is in the nature of a canopy, generally represented by the numeral 27 and this includes a substantially V-shaped plate 28 having its apex portion centrally located, and having its longitudinal edge portions formed with rolled beads 29. As seen better in Fig. 10, at each end of the plate are spaced knuckles 30 and 31 and between these knuckles as shown in Fig. 1 are openings 32. This is the forward swingable edge portion of the canopy as is obvious.

These knuckles serve to accommodate the slidable latch pins 33 and it will be observed that each pin is provided with a handle portion having a retaining eye 34 located in a position to engage in the adjacent keeper clip or bracket 35, when the latch is in a retracted position. Obviously the stem portion of the latch is slidable through the knuckles 30 and 31.

The hinged end portion of the canopy is formed with depending end flanges 36 having apertured ears 37. The numeral 38 designates vertical standards carrying the turnable roost forming roller 39 to prevent perching of chickens on the canopy.

The canopy and its appurtenances as a unit, is supported from a pair of duplicate supporting bars, generally designated by the numeral 40. Each of the bars are represented in Fig. 11, and it includes a double-ply body portion 41 having bolt holes 42 and 43 adjacent the opposite ends. These receive the adjusting bolts 44 which as is obvious, have their threaded ends extending out through the elongated slots 18 to accommodate the retaining nuts 45. This bolt and nut arrangement permits the parts 40 to be raised and lowered as desired.

It will be noticed in Fig. 11, that the box end portions 46 forms a sort of a sheath for the hinge ear 37 on the canopy, and by observing Fig. 9, it will be seen that the numeral 47 designates a pivot pin which extends through the sheath and the ear to hingedly connect the adjacent end of the canopy thereto. Both ends of the canopy are mounted on the parts 40 in the same way.

Thus the parts 40 constitute carriers or mounting bars for the canopy and permit the canopy to be swung upwardly and back in a direction from right to left in Fig. 3 for example. The opposite end portion of the bar 40 is formed with an extension 48 projecting upwardly through the adjacent opening 32 as seen in Fig. 1 and terminating in a supplemental knuckle 49 for disposition between the aforesaid knuckles 30 and 31 to receive the stem of the latch.

At this same end is an especially formed portion defining what may be designated as a foot 50 on which the adjacent edge portion of the canopy rests as shown in Fig. 3. Incidentally the numeral 51 designates a flange which cooperates with the heads of the bolts 44 as shown in Fig. 3, to prevent turning of the bolts so as to facilitate adjustment of the entire roof assembly.

The roof "assembly" comprises a canopy, the bars 40 and the associated details. Under this arrangement, by loosening the nut 45, the assembly may be raised and lowered and properly positioned in the slots 18 as is obvious, thus moving it toward or from the trough construction. It might be mentioned too, that the numerals 52 designate entrance slots, defined between the complemental edge portions of the trough and roof assembly, through which the chicks are permitted to feed from the trough.

It is obvious, that by releasing the latch pins from the adjacent retaining knuckles and sliding the pins back and engaging them with the keeper brackets 35, the entire canopy can be swung upwardly to an open position to facilitate filling of the trough.

Briefly, the gist of the invention is in the provision of a structure characterized by the vertical end walls 13 and 14, cooperating with the trough and roof assembly forming a housing, together with the adjustable mounting of the roof assembly on these end plates, and the relative adjustment of the trough. Moreover, emphasis is laid on the particular construction of the roof assembly and the hinged arrangement, whereby the canopy can be swung to an open position to facilitate the replenishing of the food supply whenever desired. Then, too, the knockdown and separable construction for repair and cleaning is of importance.

These and other features and advantages of the invention have doubtless been made apparent from the foregoing description and drawings.

It is thought that persons skilled in the art to which the invention relates will be able to obtain a clear understanding of the invention, after considering the description in connection with the drawings. Therefore, a more lengthy description is regarded as unnecessary.

Minor changes in the shape, size, and rearrangement of details coming within the field of invention claimed, may be resorted to in actual practice if desired.

Having thus described my invention, what I claim as new is:—

1. A poultry feeder comprising a pair of end members having upper and lower vertically arranged slots therein, a trough located between the lower portions of the end members, bolts passing through the ends of the trough and through the lower slots, nuts on the outer ends of the bolts whereby the trough can be adjusted vertically between the end members, a pair of end bars, bolts passing through said end bars and through the upper slots in the end members, nuts on the outer ends of the bolts whereby the end bars can be adjusted vertically, a roof member having one edge hingedly connected at its ends to the ends of the end bars, a seat at the other end of each end bar forming a rest for the other edge of the roof member and latch means for connecting said other edge of the roof member to the end bars.

2. A poultry feeder comprising a pair of end members having upper and lower vertically arranged slots therein, a trough located between the lower portions of the end members, bolts passing through the ends of the trough, and through the lower slots, nuts on the other ends of the bolts whereby the trough can be adjusted vertically between the end members, a pair of end bars, bolts passing through said end bars and through the upper slots in the end members, nuts on the outer ends of the bolts whereby the end bars can be adjusted vertically, a roof member having one edge hingedly connected at its ends to the ends of the end bars, a seat at the other end of each end bar forming a rest for the other edge of the roof member and latch means for connecting said other edge of the roof member to the end bars, uprights on the ends of the roof member at the center thereof, and a rotary member having its ends rotatably supported by said uprights.

In testimony whereof I affix my signature.

PETER P. HESS.